W. G. RANSOM.
EQUALIZING BRAKE GEAR FOR RAILWAY CARS.
APPLICATION FILED JAN. 2, 1909.
1,002,312.
Patented Sept. 5, 1911
4 SHEETS—SHEET 1.
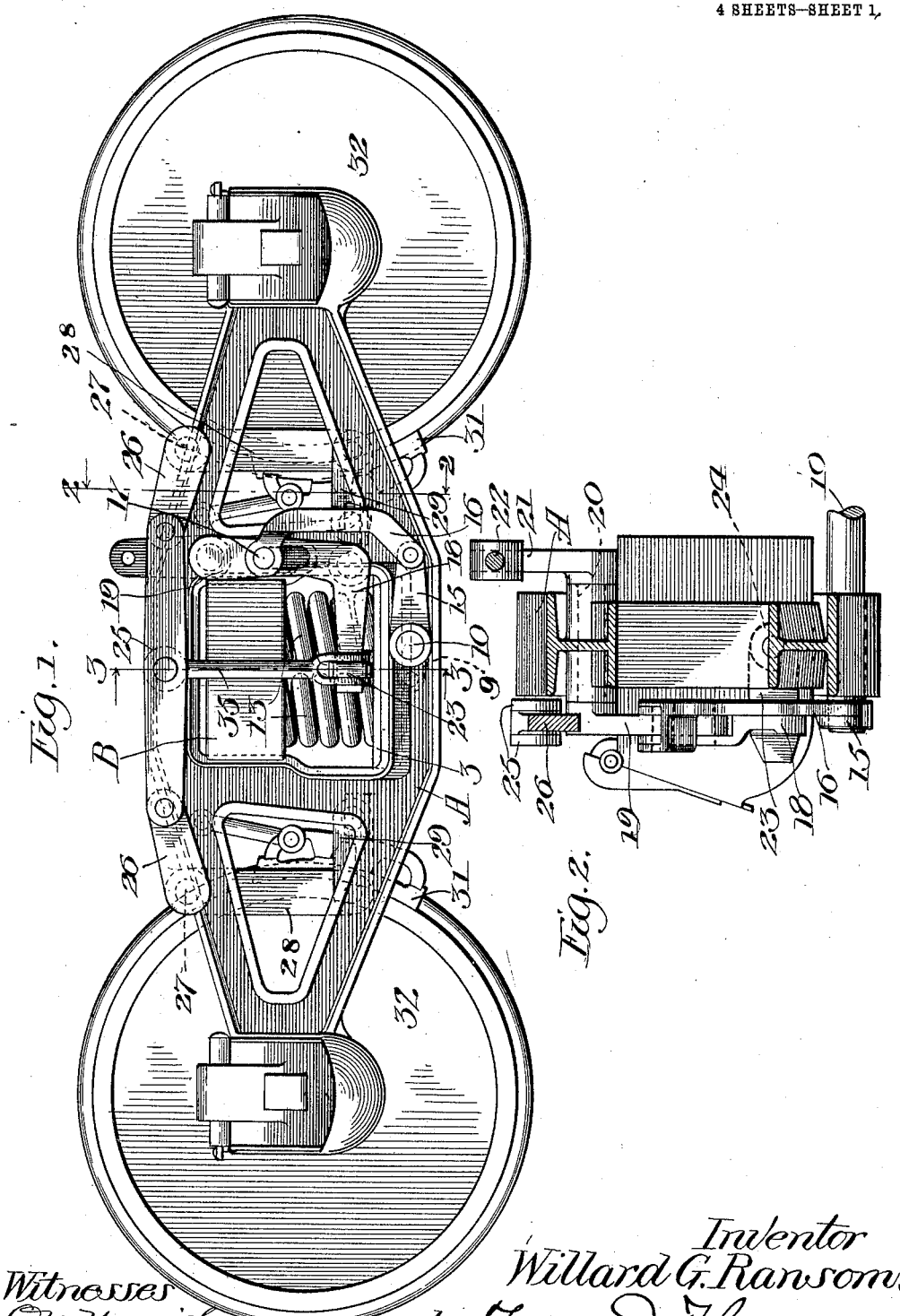
Witnesses
Inventor
Willard G. Ransom,
by Frank D. Thomason
Atty

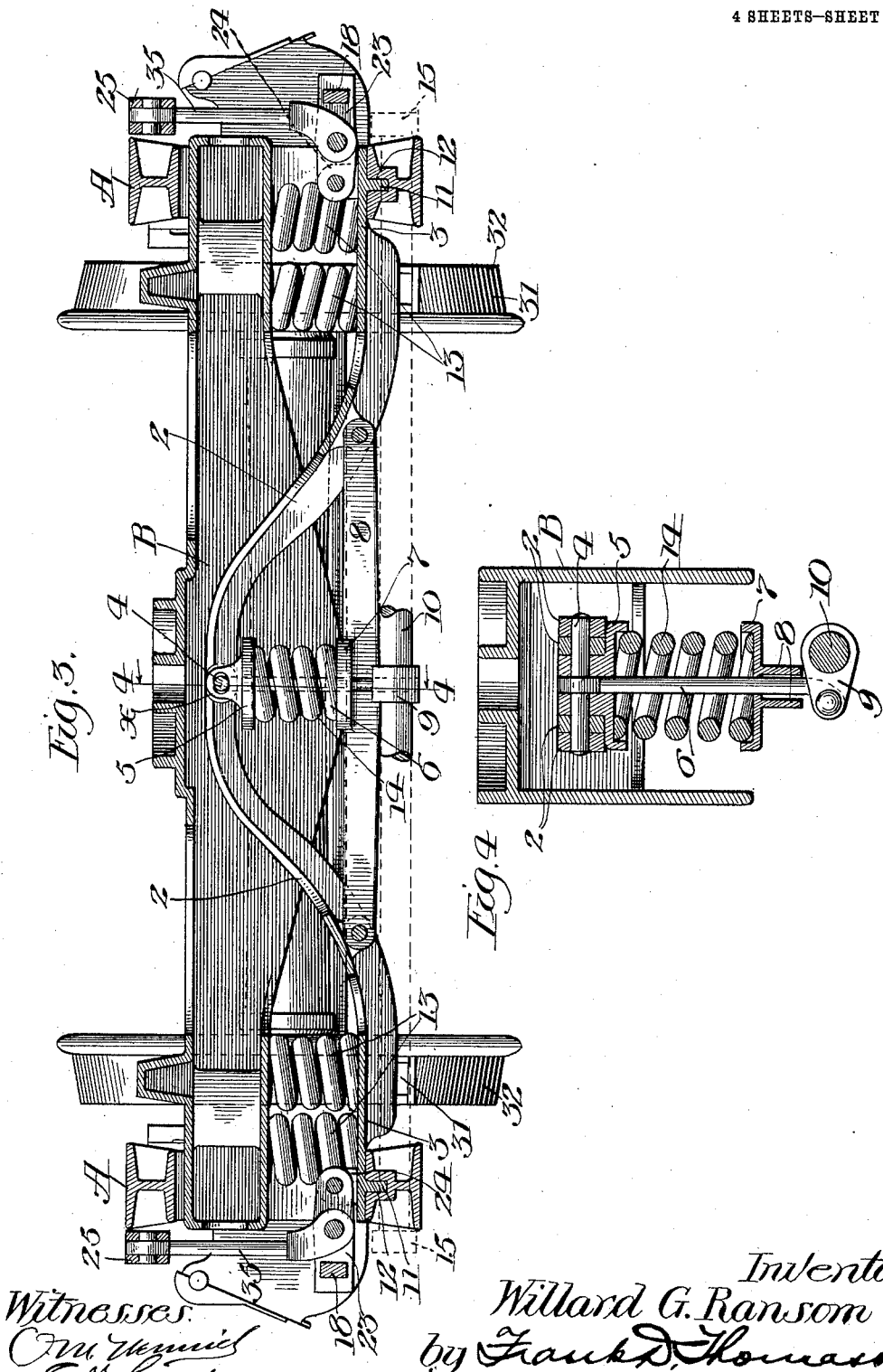

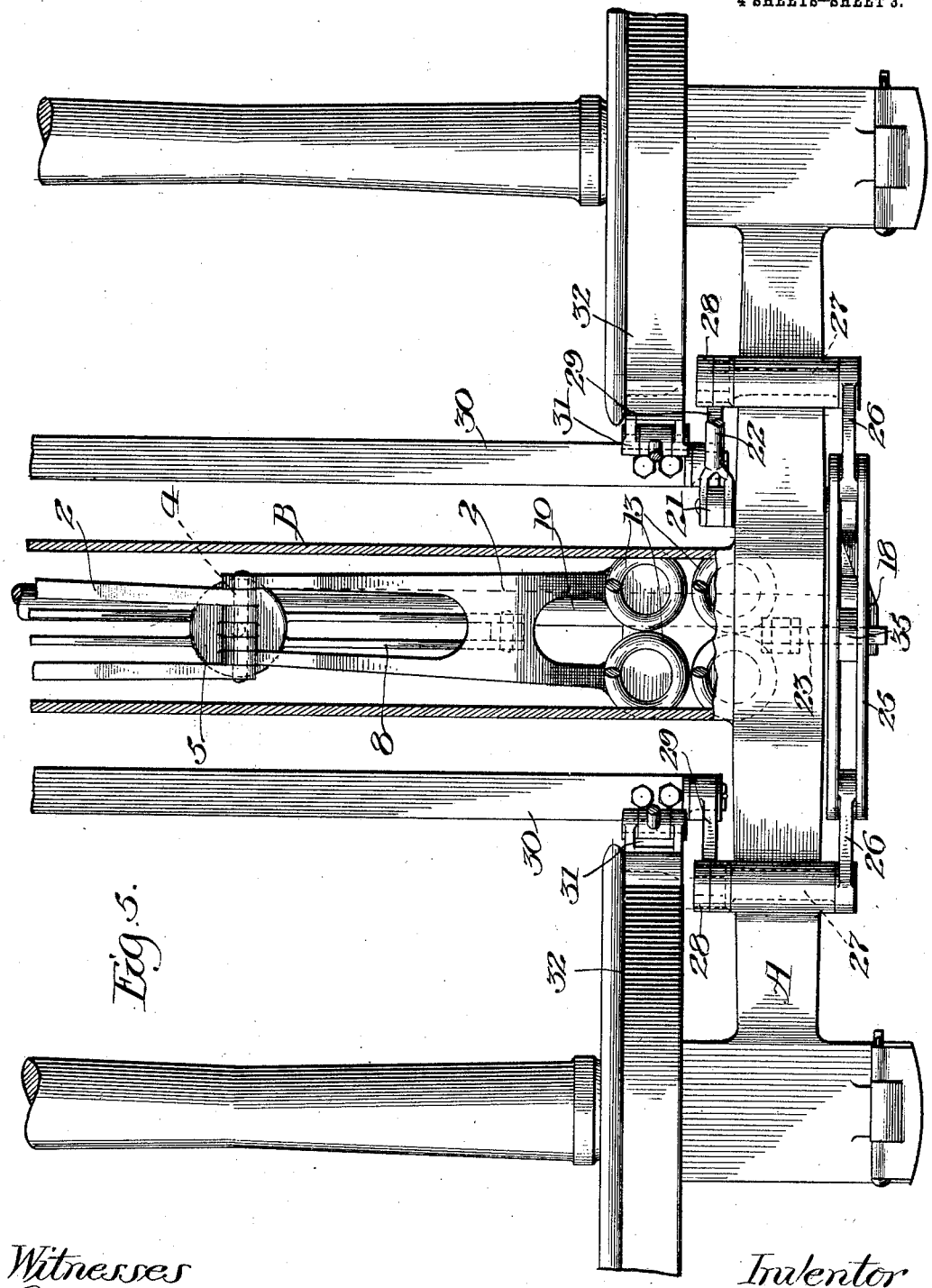

W. G. RANSOM.
EQUALIZING BRAKE GEAR FOR RAILWAY CARS.
APPLICATION FILED JAN. 2, 1909.
1,002,312.
Patented Sept. 5, 1911.
4 SHEETS—SHEET 4.
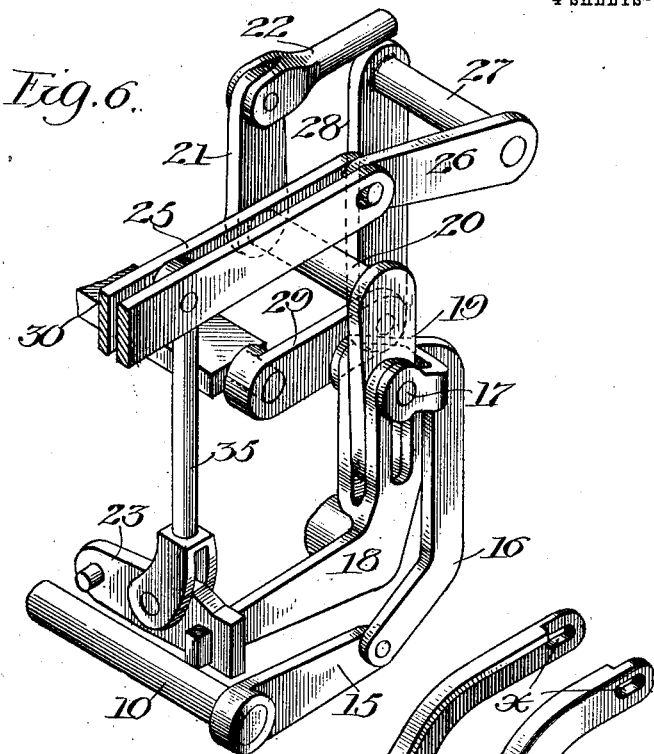
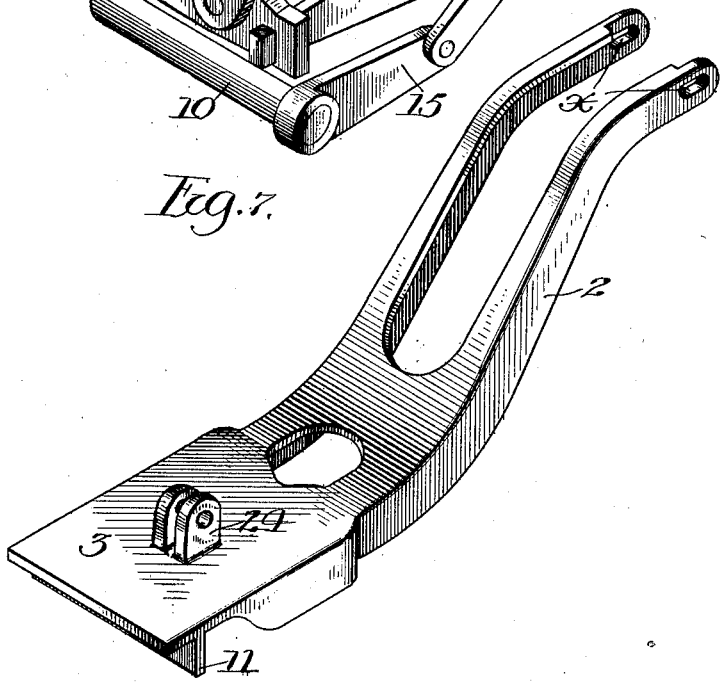
Witnesses
Inventor
Willard G. Ransom

UNITED STATES PATENT OFFICE.

WILLARD G. RANSOM, OF DAVENPORT, IOWA.

EQUALIZING BRAKE-GEAR FOR RAILWAY-CARS.

1,002,312.  Specification of Letters Patent.  Patented Sept. 5, 1911.

Application filed January 2, 1909. Serial No. 470,415.

*To all whom it may concern:*

Be it known that I, WILLARD G. RANSOM, a citizen of the United States, and a resident of Davenport, in the county of Scott and State of Iowa, have invented certain new and useful Improvements in Equalizing Brake-Gears for Railway-Cars, of which the following is a clear, full, and exact description.

My invention relates to the brake gear of railway cars and particularly to the mechanism thereof carried by the car-trucks and directly affecting the movement of the brake-shoes toward the wheels.

The object of my invention is to apply a brake-pressure to the wheels of each truck proportionate to the load carried thereby over and above that represented by the weight of the empty car.

A further object is to apply brake pressure to each truck of a train proportionate to the load carried by that particular truck, and to provide a ratio of the brake pressure to the load.

I accomplish the above objects by utilizing the weight of the load on each truck as a means for effecting these results through the compression or expansion of the springs under increased or decreased load. And a still further object is to arrange a system of levers so that a reaction upon one or more of the load-supporting members of the truck will permit the force of the brake-shoes to neutralize with the load on that particular supporting member in such manner as to prevent the pressure on said brake-shoes from exceeding a predetermined percentage of the weight of the load on said member. All of this I accomplish by the means and in the manner hereinafter fully described and as more particularly pointed out in the claims.

In the drawings:—Figure 1 is a side elevation of a truck embodying my invention. Fig. 2 is a transverse section through one side-frame of the truck, taken on dotted line 2—2, Fig. 1, and omitting the brake-beam and hangers thereof, spring-planks and bolster. Fig. 3 is a similar view taken on dotted line 3, 3, Fig. 1. Fig. 4 is an enlarged transverse vertical section taken on dotted line 4—4, Fig. 3. Fig. 5 is a plan view of one-half of the truck embodying my invention and with the top of the bolster cut away. Fig. 6 is a perspective view of a fragment of my invention. Fig. 7 is a perspective view of one of the compression members of the spring-plank.

In the drawings A represents the side-frame of a car-truck in which the upper arch, the lower arch, guide-columns, and the journal-boxes are, preferably, cast in one piece of metal, and B represents a bolster the ends of which are made tubular and rectangular in cross-section, and, together with the top and sides, are, preferably, cast in one piece of metal. Between its box shaped or tubular ends the bolster is of an inverted channel-shape, and the side-walls thereof are increased in depth as they approach the center of length of the same so as to give the bolster a truss-shape. Arranged longitudinally under the bolster is a spring-plank that consists of two compression members 2, 2, the antipodal end of each of which is flattened, to form a platform 3 that rests upon the sill of the bolster-opening in the side-frame, from whence it extends horizontally for a short distance and is then curved upward toward the center of length of the bolster under which said members terminate and are jointed together. The upwardly curved portions of these members are, preferably, bifurcated, and the ends of said bifurcations are provided with longitudinally elongated openings therein, and are articulated with the ends of the bifurcations of the opposite compression member, by means of a pintle 4, the central portion of which latter passes through lugs arising centrally from a spring-cap 5, and through an opening in the upper end of a vertical connecting-rod 6. The lower end of rod 6 extends down through the central opening of a spring-seat 7, and between the parallel members of a bridge or tie-bar 8, and has its lower extremity curved slightly to one side, and pivoted to the end of an arm 9 projecting from a horizontal shaft 10, arranged below and parallel with the body-bolster, and has its ends journaled in suitable bearings in the side-frames near the center of the lower arch thereof below the sill of the bolster opening. Platform 3 of the compression members of the spring-plank are provided with downwardly projecting transverse tenons 11, which enter grooves 12 made to receive the same in the sills of the bolster-openings.

Coil-springs 13 are seated upon platform 3, preferably, inside of the vertical plane of the arch of the side-frames, which support the ends of the bolster. The weight of the bolster and the load carried thereby would, ordinarily, have a tendency to move the central portion of the compression members of the spring-plank downward until such movement was stopped by reason of the outer ends *x* of the elongated openings, in their articulated ends, coming in contact with the pintle 4. This depression of the said members 2 is resisted, however, by a coil compression spring 14, which is interposed between the spring-cap 5, and the spring-seat 7 of the bridge 8 and by the elasticity of the members 2 of the spring-plank themselves. The bridge or tie-bar 8 consists, preferably, of a horizontal bar extending in the same direction as said compression members, to which latter its ends are connected, by means of lugs projecting downward from the compression members at about the base of their upward curved portions. Ordinarily the weight of the bolster, and the empty car-body will be sustained by springs 13, and the spring-plank and bridge 8 will not be materially affected thereby, but when the weight of the car plus its load exceeds a certain predetermined limit which is generally determined by the weight of the unloaded car-body, the articulated ends of the compression members move downward to an extent proportionate to the load, in opposition to the resistance offered by spring 14, and through the medium of connecting-rod 6 and arm 9, rock shaft 10 slightly.

The ends of the rock-shaft 10 extends through its bearings, and are provided with arms 15, that project, preferably, in a direction diametrically opposite to that of arm 9, which they exceed in length. The ends of arms 15 have the lower ends of vertically disposed links 16 pivotally connected thereto, which latter are made somewhat bow-shaped to enable them to avoid interfering with the other parts of my invention. The upper ends of these links 16 extend to a point slightly above the horizontal plane of the center of height of the bolster-opening, and are bent toward said bolster-opening and bifurcated. These bifurcations are connected by a pivotal bolt 17, and this pivotal bolt 17 constitutes the shifting pivotal connection between the upper end of the vertical arms of a bell-crank 18, and the lower ends of arms 19 projecting downward from the adjacent end of a spindle 20, which is journaled in bearings in the side-frames near the upper end of one of the guide-columns thereof. I prefer to bifurcate the vertical arm of said bell-crank and to extend arm 19 down between these bifurcations, and I provide these bifurcations and arm 19 with longitudinally elongated openings through which pivotal bolt 17 extends. It will be obvious that whenever rock-shaft 10 turns, links 16 will move up and down and will shift the point of pivotal connection between the bell-crank 18 and arms 19. Spindles 20 have arms 21 projecting vertically upward therefrom, and the upper ends of these arms 21 are pivotally connected to the rods 22. When pivotal bolts 17 move toward the upper limits of the elongated openings of the vertical arms of the bell-crank 18, a given force from the brake-rods 22, will cause the horizontal arm of said bell-crank to have a proportionately greater force than when said bolts are near the lower end of said openings. The end of the horizontal arm of the bell-crank extends through an opening in the end of a short lever 23, extending transversely thereto, or in a plane parallel to that of the bolster, and its inner end is fulcrumed between lugs 24 cast or otherwise made integral with and project from the center of platform 3 of the spring-plank. At about their centers of length, these levers 23, have the lower bifurcated ends of a vertical rod 35 pivotally connected thereto, and the upper end of these rods extend between the centers of length of parallel members of cross-bars 25. These cross-bars are horizontal, and are arranged opposite the outer surface of the central portion of the upper arch bar of the side-frames above the bolster-opening, and have their ends pivotally connected to the extremities of arms 26, projecting toward the same from the outer end of spindles 27 journaled in suitable bearings made in the side-frames, and have arms 28 projecting downward from their inner ends, which latter have their lower extremities connected by links 29, to the brake-means 30.

The pivotal-bolt connecting the ends of the cross-bars 25 and arms 26 is made fast in one of said parts and moves in elongated openings in the other, so that when bars 25 move up or down they impart motion to arms 26. When the force of the horizontal arm of the bell-crank 18 is increased by virtue of the increased load being carried by the car, a correspondingly increased force is imparted through the rod, 35, cross-bar 25, arms 26, spindles 27, arms 28 and links 29, to brake-beams 30, and whenever the air-brake cylinder actuates rod 22, arm 21, spindle 20, and arm 19, the power exerted by the brake-beam, through the medium of the elements thus enumerated, will be increased proportionate to the load, and will cause the brake-shoes 31 to bear proportionately harder or with greater pressure against the car-wheels 32, and, within the limits of the predetermined force, overcome the momentum of each car alike regardless of any variation in load carried by each.

Lever 23, being fulcrumed in lugs 24, and receiving its operative force from the bell-crank 18, determines the limit of the force obtainable in rod 35, which limit will be determined by the downward force on lugs 24, or the weight on the spring-plank 3. Should, however, the force exerted from the bell-crank arm 18 become sufficient to elevate the spring-plank, then rod 35 will become rigid. If this contingency occurs, due to the force transmitted from the brake-actuating mechanism becoming too great, then the weight of the load upon the spring-plank will actually determine the limit of the pressure that is obtainable at the brake-shoes.

What I claim as new is:—

1. An equalizing brake-gear for cars comprising a car-truck having side-frames, wheels, and brake-shoes engaging the same, brake actuating devices, and mechanism comprising several operatively connected parts independent of said brake actuating devices some of which are connected directly to said side-frame and affected by the weight of the load to increase or decrease the power transmitted to the brake-shoes by said brake actuating devices.

2. An equalizing brake-gear for cars comprising a car-truck, truck-bolster and spring-plank therefor, and brake-shoes, devices the extent of the operation of which is determined by the depression of said spring-plank, brake actuating mechanism, and means independent of the brake actuating mechanism and affected by said devices for automatically controlling the pressure of the brake-shoes nearer the car-wheels.

3. An equalizing brake-gear for cars comprising a car-truck, a truck-bolster, a spring-plank, bolster-springs, and brake-shoes, brake-actuating mechanism, means independent of the brake-actuating mechanism that are operated by the depression of the truck-bolster and are adapted to increase or decrease the pressure of the brake-shoes against the wheels, and means, which, when said shoes have reached the limit of their effective braking pressure, utilize the excess brake-actuating power to lift said bolster-springs.

4. An equalizing brake-gear for cars comprising a car-truck having a truck-bolster, a spring-plank, and brake-shoes, devices carried by said truck the extent of the leverage of which is determined by the depression of said spring-plank, brake-actuating mechanism, and means independent of the brake-actuating mechanism which are operated by said devices to increase or decrease the pressure of the brake-shoes upon the car-wheels according to the leverage of said means.

5. An equalizing brake-gear for cars comprising a car-truck having a truck-bolster, bolster-springs, a spring-plank, and brake-shoes, devices carried by said truck the extent of the leverage of which is determined by the depression of said spring-plank, brake-actuating mechanism, and means independent of the brake-actuating mechanism adapted, when said shoes have reached the limit of their braking pressure, to utilize the excess brake actuating power to lift said bolster-springs.

6. An equalizing brake-gear for cars comprising a truck-bolster, a spring-plank consisting of two parts the adjacent ends of which are articulated together, brake-shoes, devices the movement of which is determined by the depression of said spring-plank, brake actuating mechanism, and means independent of the brake actuating mechanism which are adapted, when said shoes have reached the limit of their braking pressure, to utilize the excess brake-actuating power to lift said bolster-springs.

7. A foundation brake-gear for cars comprising a truck-bolster, side-frames, and devices actuated by the weight of the load upon said truck-bolster, and means carried by said side-frames two of the coacting parts of which have an automatically shifting pivotal connection for increasing or decreasing the force of the brake-shoes upon the car wheels, as said force is transmitted through this pivotal connection from the brake actuating mechanism to the brake-shoes.

8. A foundation brake-gear for cars comprising side-frames and a truck-bolster, springs, devices the extent of operation of which is determined by the weight of the load upon the said bolster, and means carried by said side-frames independently of the brake-actuating mechanism affected by said devices, and adapted to increase or decrease the force transmitted from the brake-actuating mechanism to the brake-shoes, so that when said brake-shoes have received the maximum pressure a reactionary movement will be set up in said means thereby raising the truck-bolster with its load.

9. A foundation brake-gear for cars comprising side-frames and a truck-bolster, a spring-plank, and devices the extent of the movement of which is determined by the depression of said spring-plank, and means carried by said side-frames independent of the brake actuating mechanism and affected by said devices to increase or decrease the force of the brake-shoes against the wheels when said force has been transmitted from the brake actuating mechanism to the brake-shoes.

10. A foundation brake-gear for cars comprising a truck-bolster, a spring-plank, and devices the extent of the movement of which is determined by the depression of said spring-plank, and means independent of the brake-actuating mechanism affected by said devices and adapted to increase or decrease the force of the brake-shoes against the wheels when said force has been transmitted from the brake actuating mechanism to the brake-shoes; but, when said shoes receive a braking pressure in excess of the designed limit, the spring-plank will be raised, and in raising equalize the brake-shoes' pressure with the weight of load on the spring plank, thus determining a high limit of brake power.

11. A foundation brake-gear for cars comprising side-frames, a truck-bolster, a spring-plank, consisting of two parts, the adjacent ends of which are articulated together, and devices the extent of the movement of which is determined by the depression of said spring-plank, and means carried by said side-frame independent of the brake actuating mechanism adapted to increase or decrease the force of the brake-shoes against the wheels as the load on said spring-plank is increased or decreased.

12. A foundation brake-gear for cars comprising a truck-bolster, a spring-plank consisting of two parts, the adjacent ends of which are articulated together, and devices the extent of the movement of which is determined by the depression of said spring-plank, and means independent of the brake actuating mechanism adapted to increase or decrease the force of the brake-shoes against the wheels as the load on said spring-plank is increased or decreased, and adapted, when said shoes have reached the highest designed limit of their braking pressure, to lift said spring-plank.

13. A foundation brake-gear for cars comprising means that are actuated by the load and transmit movement from a point beneath the center of length of the truck-bolster, devices that convey said movement transversely from the center of length of the truck-bolster to the side-frames, and mechanism carried by said frames of the car-truck that change the degree of power exerted by the brake actuating mechanism effective at the brake shoes.

14. A foundation brake-gear for cars comprising means that receive and are actuated by the weight of the load, a transverse rock-shaft below the track-bolster, the extent of the movement of which on its axis is proportionate to the weight of said load, and devices adapted to convey the movement of said shaft to, and change the power of, the gear which makes the force of the brake actuating mechanism effective at the brake-shoes.

15. A foundation brake-gear for cars comprising means that receive and are actuated by the weight of the load, a transverse rock-shaft below the truck-bolster the extent of the movement of which on its axis is proportionate to the weight of said load, and devices two of the parts of which have an automatically shifting pivotal connection which are adapted to change the power of the gear which makes the force of the brake actuating mechanism effective at the brake-shoes.

In witness whereof I have hereunto set my hand and seal this 31st day of December, 1908.

WILLARD G. RANSOM. [L. S.]

Witnesses:
FRANK D. THOMASON,
E. K. LUNDY.

---

Copies of this patent may be obtained for five cents each, by addressing the "Commissioner of Patents, Washington, D. C."